Aug. 25, 1964     O. W. SEPP, JR     3,145,955
PILOT CHUTE DEPLOYMENT SYSTEM

Filed Aug. 2, 1962     5 Sheets-Sheet 1

INVENTOR.
OSCAR W. SEPP, JR.
BY
Burgess, Ryan & Hicks
ATTORNEYS

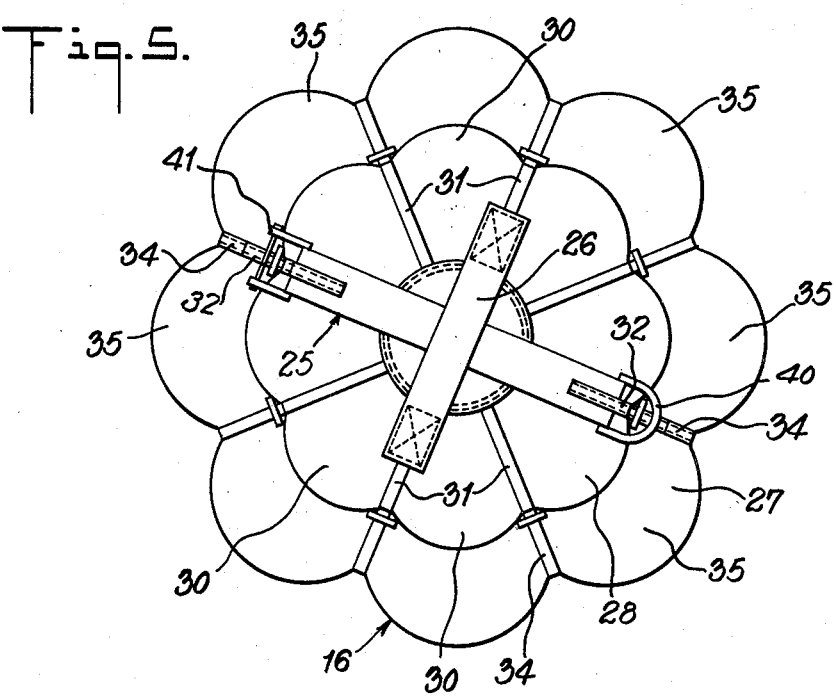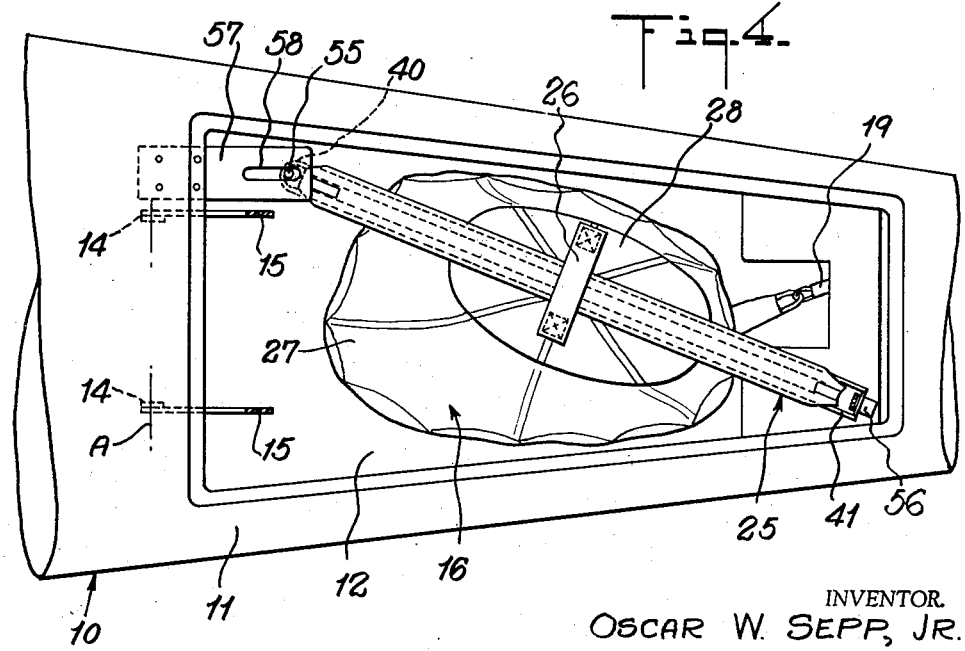

Aug. 25, 1964 O. W. SEPP, JR 3,145,955
PILOT CHUTE DEPLOYMENT SYSTEM
Filed Aug. 2, 1962 5 Sheets-Sheet 3

INVENTOR.
OSCAR W. SEPP, JR.
BY
Burgess, Ryan & Hicks
ATTORNEYS

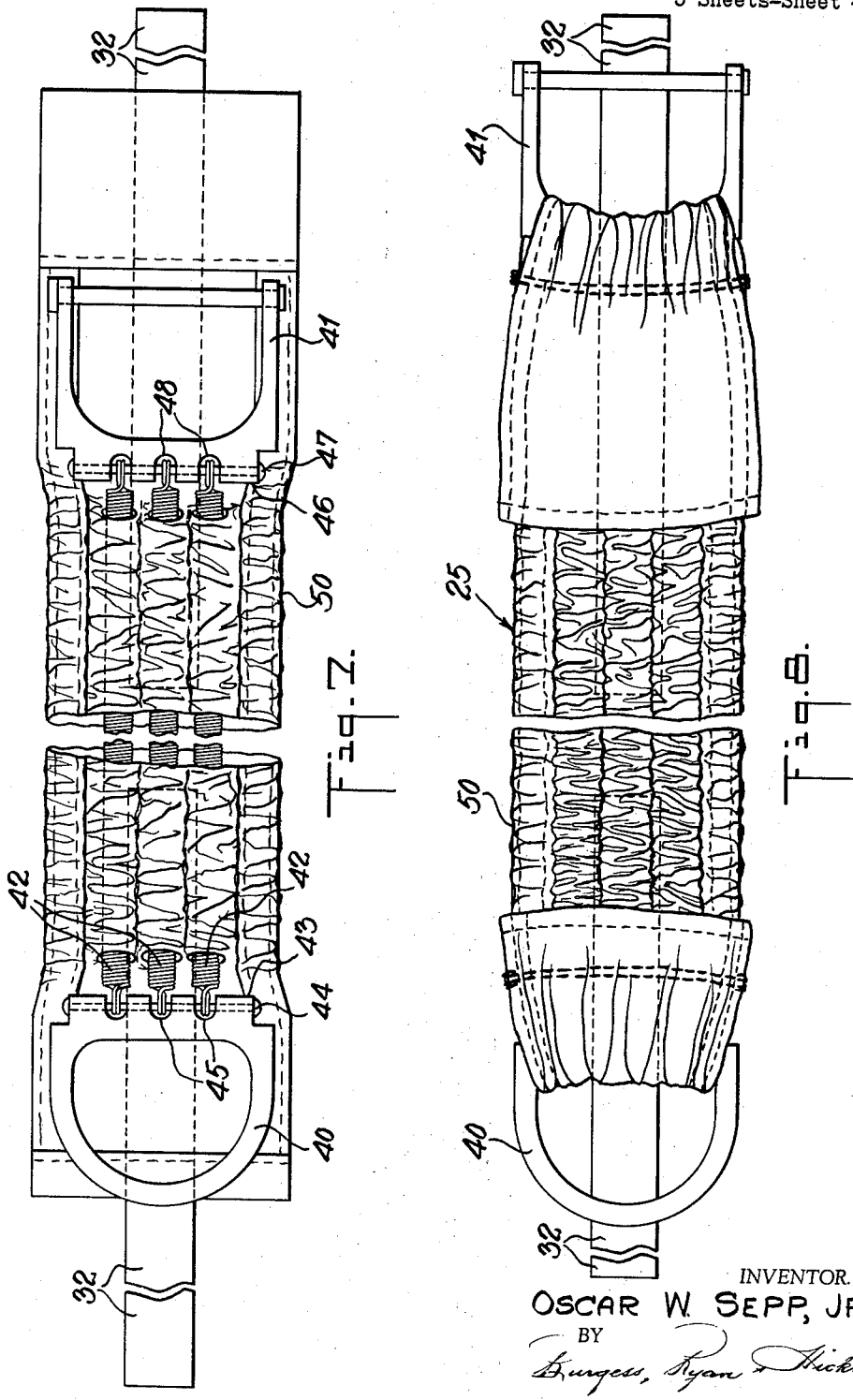

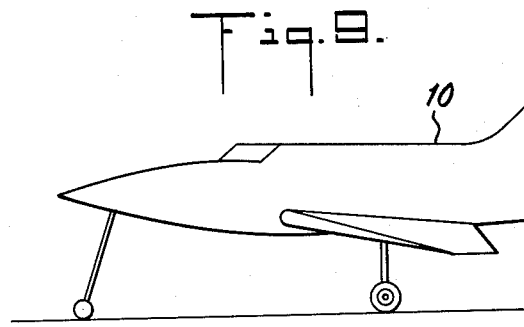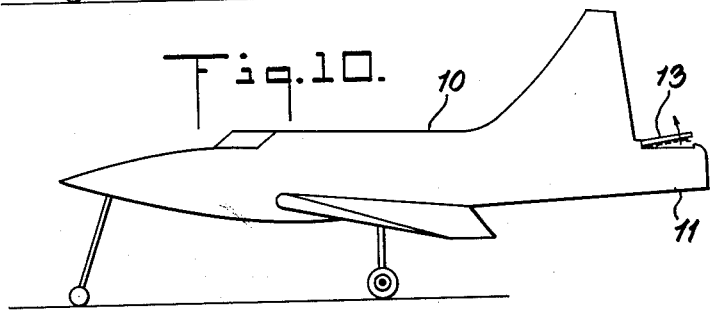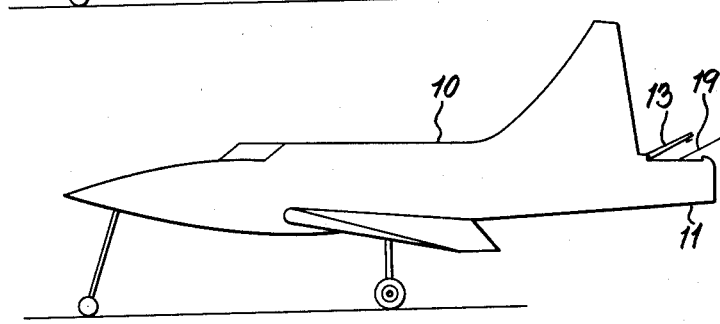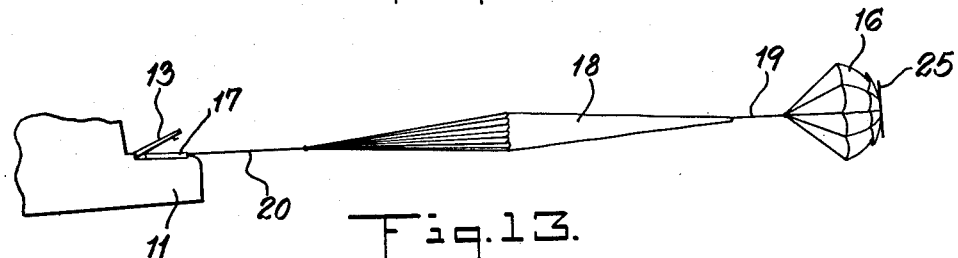

3,145,955
PILOT CHUTE DEPLOYMENT SYSTEM
Oscar W. Sepp, Jr., Merrick, N.Y., assignor to M. Steinthal & Co., Inc., New York, N.Y., a corporation of New York
Filed Aug. 2, 1962, Ser. No. 214,250
12 Claims. (Cl. 244—113)

The present invention relates to a pilot chute deployment system especially useful in connection with the braking of a high speed plane, as for example, a rocket jet plane, upon landing.

One object of the present invention is to provide a new and improved pilot chute deployment system, which is operable in connection with a fixed compartment in the tail section of a plane in which the main parachute and the pilot chute therefor are housed, and which is designed to effect spring ejection of the pilot chute from said compartment automatically upon the mere opening of the door to said compartment, to cause automatic deployment of the main parachute by the action of the pilot chute when inflated.

A further object of the present invention is to provide a pilot chute deployment system, which although employing a powerful spring device to eject the pilot chute from the tail compartment of the plane forcefully and at a high speed, subjects the pilot chute to a minimum of destructive action due to any flapping motion of the released spring device, permitting thereby said pilot chute to be employed over and over again many times.

In accordance with the present invention, to slow down a high speed plane upon landing, a main parachute and a pilot chute for effecting its deployment, are housed in a fixed compartment in the tail section or empenage of the plane. The door of the compartment is open in any suitable manner, as for example, under the control of the pilot upon landing without raising the compartment itself. An ejection spring device in the form of an elastic strap, extends across the top of the pilot chute canopy, and is connected to the top of the canopy by lanyard means. The ends of the spring device when stretched are removably attached to two spaced catches near the aft end and near the forward end of the door to the compartment. The door is supported for swinging movement about an axis located near the forward end of said door and extending transverse to the longitudinal direction of the plane and the forward catch is designed to release the end of the tensioned spring device from said forward catch automatically when the door is pivotally swung open, causing thereby the released spring device to recoil towards the aft catch. The aft catch is designed to release the recoiling spring device therefrom automatically, causing thereby said spring device to be propelled by the recoil action of the spring device forcefully and at high speed free of the door and out of the compartment into the air stream of the plane. The propelled spring device will carry with it the pilot chute and as said chute is inflated, it pulls out the main parachute from the compartment. The main parachute is desirably in a deployment bag connected to the plane and the main parachute is deployed from said bag by the combined pulling actions of the inflated pilot chute and the plane in opposite directions. Upon inflation of the main parachute, the plane will be slowed down, to limit the landing run of the aircraft to a safe distance.

As another feature of the present invention, the elastic strap has its center connected to the top of the canopy and has its ends connected to the diametrically opposite sides of the canopy by slack lanyards. With the spring device so tied to the pilot chute at both ends by the lanyards, the flapping movements and actions of the spring device are controlled and confined, so that it has a minimum of destructive action on the pilot chute when released.

Various other objects, features and advantages of the invention are apparent from the following description and from the accompanying drawings, in which—

FIG. 4 is a section of the deployment compartment and of the pilot chute deployment device taken approximately along the lines 4—4 of FIG. 1;

FIG. 5 is a top plan view of the inflated pilot chute canopy showing the spring part of the pilot chute deployment device embodying the present invention;

FIG. 7 is a plan view of the spring trap constituting part of the pilot chute deployment device, but shown prior to complete assembly;

FIG. 8 is a plan view of the spring strap of FIG. 7 but after complete assembly;

FIG. 9 is a side elevation of the aircraft shown upon landing but before the door of the deployment compartment has been released;

FIG. 10 is a side elevation of the aircraft shown upon landing and after the door has been unlatched and has started to open but before the spring strap on the pilot chute deployment device has been released;

FIG. 11 is a side elevation of the aircraft shown upon landing and after the unlatched door has opened sufficiently to release automatically the spring strap from the door and to eject the pilot chute from the deployment compartment;

FIG. 12 is a side elevation of the aircraft shown upon landing and after the spring-ejected pilot chute has fully inflated and has begun to deploy the main parachute from the deployment compartment; and FIG. 13 is a side elevation of a tail part of the aircraft and shown upon landing and after the main parachute has been deployed but before it has been inflated.

Figure 1:
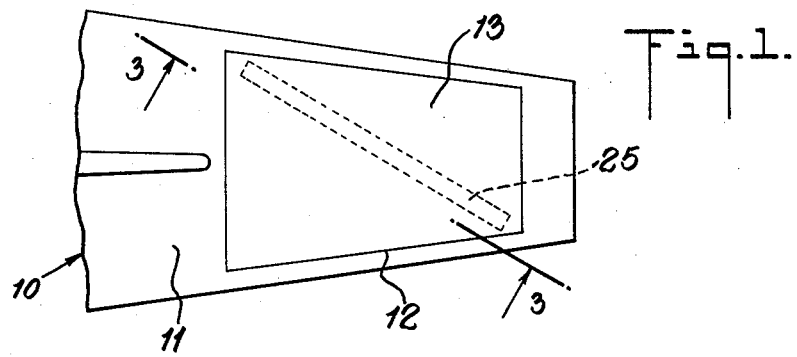
FIG. 1 is the top plan view of the tail or empenage of an aircraft containing the deployment compartment in which the pilot chute and the main parachute are housed, and shown with the door to the compartment closed.
Figure 2:
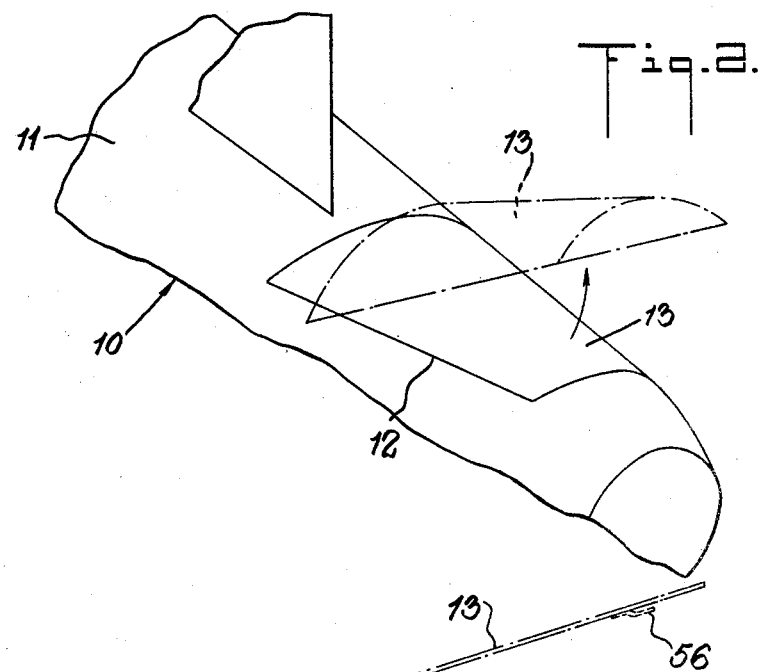
FIG. 2 is a perspective of part of the tail or empenage of the aircraft and in full lines shows the door to the deployment compartment closed and in dot and dash lines shows the door in fully opened position.

Referring to FIGS. 1-4 of the drawings, the pilot chute deployment system is shown in connection with a high speed plane 10, as for example, one of the rocket jet type, which upon landing on a runway is moving at a great speed and which must be slowed down by means of a parachute. The tail or empenage 11 of the plane 10 has built into it a compartment 12 having a door 13, which is hinged at its forward end to the fuselage of the plane about an axis A transverse to the longitudinal direction of the plane, and which when closed follows the general contour of the tail of the plane. The hinge connection for the door 13 is shown comprising two spaced arms 14 secured to the body of the plane 10, and two angular brackets 15 secured to the door 13 and pivotally secured to said arms respectively.

The door 13 is unlatched and actuated into open position either by spring means (not shown) or by hydraulic means (not shown), well known in the art, and is normally maintained in closed latched position. The pilot controls the opening of the door 13 and when his plane lands on the runway, he causes the door to open quickly either through the spring means or through the hydraulic means.

Figure 3:
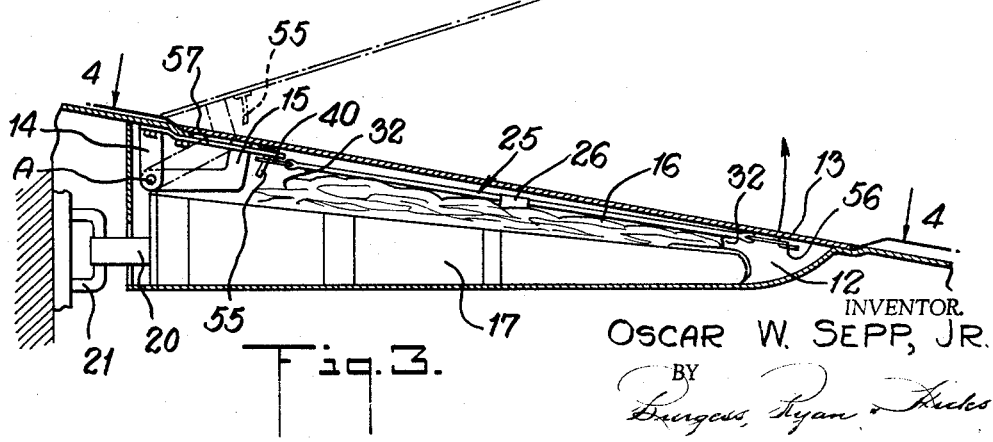
FIG. 3 is a section of the aircraft along the deployment compartment taken approximately along the lines 3—3 of FIG. 1 and showing stowed in said compartment a pilot chute deployment device embodying the present invention.
Figure 6:
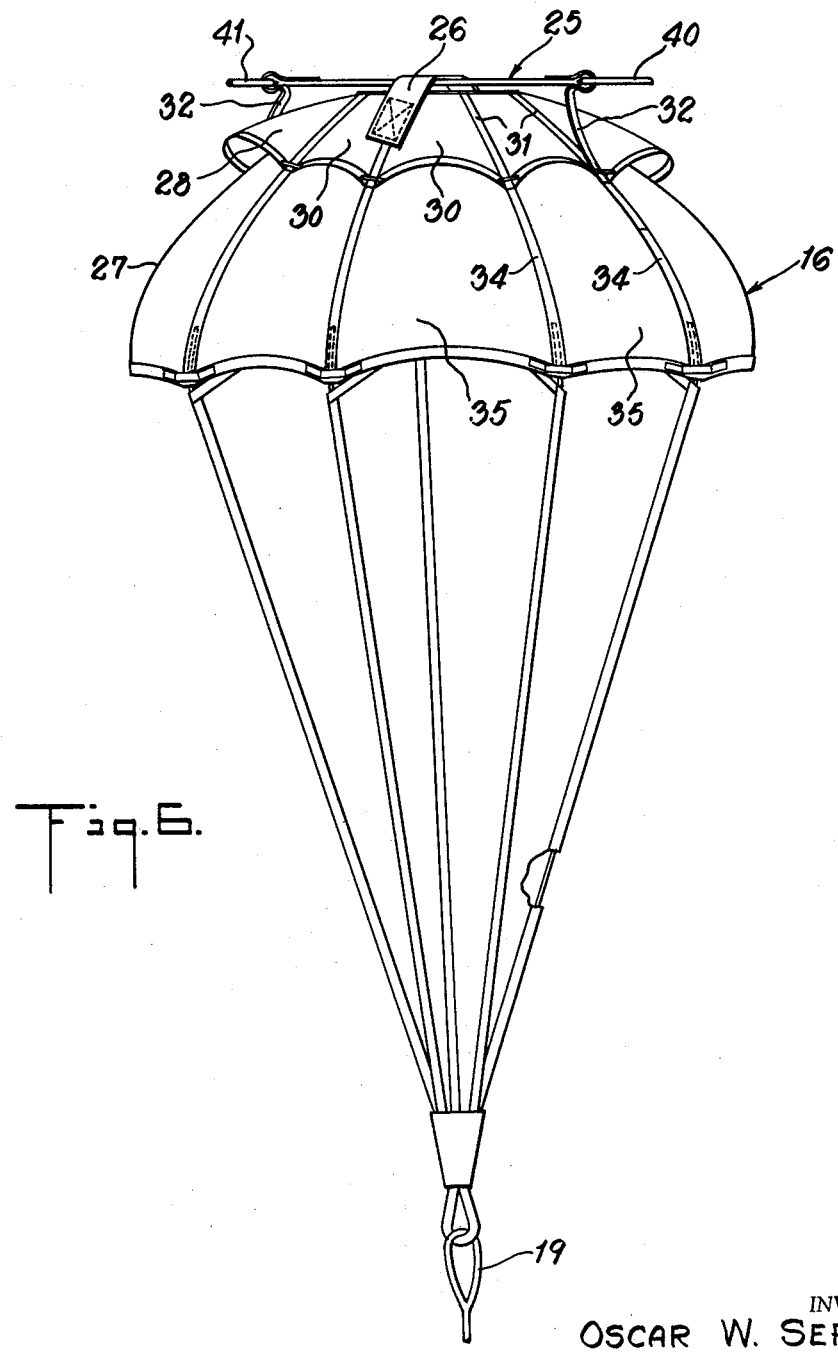
FIG. 6 is a side view of the inflated pilot chute.

Stowed inside the compartment 12 is a pilot chute 16 (FIGS. 3, 4, 5 and 6) and a deployment bag 17 in which the main parachute 18 (FIG. 13) is stowed. The riser 19 (FIGS. 6, 12 and 13) of the pilot chute 16 extends through one end of the deployment bag 17 and is connected inside said bag to the apex of the canopy of the main parachute 18, while the riser 20 (FIGS. 3 and 13) of said main parachute extends out through the other end of the deployment bag and is anchored at 21 to the body of the plane 10, as shown in FIG. 3.

The pilot chute 16 itself is of well known construction and is shown for purpose of illustration of the type disclosed in the U.S. Patent 2,974,913. Extending across the top of the canopy of the pilot chute 16 is a spring device 25 (FIGS. 3, 4, 5, 6, 7 and 8) shown in the form of a strap, the middle section of which is held down close to the top of the pilot chute by a flexible band 26, made, for example, of nylon fabric, having its ends secured to diametrically opposite sections of the canopy, as for example, by stitching. The canopy of the pilot chute 16 illustrated is shown comprising a main section 27 and an auxiliary section 28 formed of a plurality of auxiliary panels 30 secured to each other by seams 31, and the ends of the band 26 are desirably stitched to the auxiliary canopy section 28 at these seams.

The opposite ends of the spring device 25 are tied to the canopy of the pilot chute 16 by means of slack lanyards 32, secured to the ends of the spring device, as for example, by stitching and secured to diametrically opposite sections of the canopy of the pilot chute also by stitching. The lanyards 32 are shown secured to the opposite sections of the canopy of the pilot chute 16, partly to the skirt region of the auxiliary section 28 of the canopy at the seams 31 of said canopy section, and partly to the main section 27 of the canopy at the seams 34 between the panels 35 of said main section.

The spring device 25 comprises a pair of metal clasps or buckles 40 and 41 (FIGS. 7 and 8) interconnected by a series of parallel coil springs 42, three being shown. The clasp 40 is shown in the form of a D-ring and the clasp 41 is shown in the form of an open substantially rectangular link. To secure the ends of the springs 42 to the clasps 40 and 41, the clasp 40 has a section 43, which is curled to form a bearing for a pin 44 and which is provided with spaced notches or recesses 45 to expose parts of the pin for the attachment of the hooked ends of the coil springs thereto. The clasp 41 is similarly provided with a curled section 46 serving as a bearing for a pin 47 and formed with recesses or notches 48 to expose at intervals the pin for attachment of the hooked ends of the coil springs 42 thereto.

The coil springs 42 have their intermediate sections enclosed in a flexible fabric bag 50 made, for example, of two fabric pieces of different width laid face to face, with the margins of the wider sheet hemmed over and stitched to the margins of the other sheet. This bag 50 is shirred to permit the expansion of the coil springs 42 therein without interference from said bag, and the hemmed end sections of this bag are folded over through the clasps 40 and 41 and over the exposed ends of the coil springs and are stitched to the body of the bag, as shown in FIG. 8. The lanyards 32 in the form of fabric tapes are stitched to the spring bag 50 at one end and stitched to the diametrically opposite sections of the canopy of the pilot chute 16, as previously described.

The door 13 has two catches 55 and 56 for the ends of the spring device 25 preferably located along a line somewhat diagonally of the door, to extend the spring device 25 in a similar diagonal direction as shown in FIG. 4, to eject the pilot chute 16 not in turbulent region of the slip stream just behind the plane but in the side regions of the stream, where the flow is more laminar, and where the opening of the ejected pilot chute is effected more quickly and orderly. The catch 55 located near the forward end of the door 13 is in the form of a pin secured to the underside of the door and depending therefrom. A stripper plate 57 fixedly secured to the fuselage or frame of the plane aft of the door has an elongated opening 58 through which the pin 55 extends. The lower section of the pin 55 projects below the stripper plate 57 and in closed position of the door 13, the clasp 40 of the spring device 25 engages this projecting lower section of the pin 55, as shown in full lines in FIG. 3. While the door 13 is opening, the pin 55 is withdrawing from engagement with the clasp 40 and the stripper plate 57 is holding the clasp 40 and is preventing this clasp from following the door in its opening movement. When the pin 55 has completely moved free of the clasp 40, this clasp will be released, causing the spring device 25 to recoil towards the catch 56 near the aft end of the door 13.

The catch 56 is fixedly secured to the door 13 on the underside thereof near the aft end of the door. This catch 56 is shown in the form of a bar having its intermediate section offset to define one end section secured to the door, as for example, by rivets and having its other end section forming a hook on which the clasp 41 is releasably held. The catch 56 is free on its aft end so that when the spring device 25 recoils, it will automatically disengage itself from the catch.

The distance between the catches 55 and 56 is greater than the distance between the clasps 40 and 41, but the spring device 25 can be tensioned to slip the clasp 40 over the pin 55, while the door 13 is partially closed sufficiently, so that the lower end section of the pin projects below the stripper plate 57 and to slip the clasp 41 over the catch 56.

The pilot chute 16 with the spring device 25 attached thereto, and the deployment bag 17 containing the main parachute 18 are stowed together in the compartment 12. The door 13 is then closed sufficiently to project the pin 55 below the fixed stripper plate 57 and the clasp 40 on the spring device 25 is latched onto the lower projecting end of the pin 55. The spring device 25, while the door 13 is still in this partially open position, is pulled against its inherent resiliency to tension the spring device and to latch its clasp 41 onto the catch 56. The door 13 is then closed and latched into closed position, thereby maintaining the assembly in the loaded ready state shown in FIGS. 3 and 4.

At the instant the plane is landing at high speed on a runway, the door 13 to the compartment 12 is latched in closed position as shown in FIG. 9. The pilot at that instant, releases by remote control, the latch closing the door 13, and permits the door under spring or hydraulic action to swing open quickly about the hinge axis A, as shown in FIG. 10. As the door 13 swings open, the pin 55 on the door pulls out of engagement with the clasp 40, while the fixed stripper plate 57 holds the clasp against following the door, until the clasp is free from engagement with the pin. As soon as the pin 55 clears the clasp 40, the highly tensioned spring device 25 will be released and will recoil in a diagonally aft direction towards the catch 56, causing said spring device to become disengaged from said catch 56 and the spring device to be propelled at high speed from the opening compartment through the exitway between the open door 13 and the compartment 12, as shown in FIG. 11. The propelled spring device 25 will carry the pilot chute 16 with it out of the compartment 12 and clear of the plane into the side of the slip stream of the plane, where the flow is more laminar than it is directly behind the pilot, thereby causing the pilot chute to open up, as shown in FIG. 12. The inflated pilot chute 16 will pull out the main parachute 18 out of the deployment bag 17, while the bag remains in the compartment 12, as shown in FIG. 13. Since the riser 20 of the main parachute 18 is anchored to the plane at 21, as shown in FIG. 3, the main parachute 18 upon becoming inflated, will exercise a braking influence on the plane, while the pilot chute collapses, thereby limiting the landing run of the aircraft to a safe distance.

The ejection system described is carried out orderly with a minimum of destructive action on the pilot chute 16, so that the pilot chute with its ejection system can be employed over and over again many times.

Although the pilot chute deployment device is illustrated herein in connection with a system in which the deployment bag for the main parachute is retained at least partly in the compartment 12 of the plane, while the main parachute is being drawn out of said deployment bag by the ejected inflated chute, as far as certain aspects of the invention are concerned, the pilot chute deployment system can be operated in conjunction with a system in which the deployment bag is pulled out of the compartment by the ejected inflated pilot chute and the main parachute is then deployed from the bag.

While the invention has been described with particular reference to a specific embodiment, it is to be understood that it is not to be limited thereto but is to be construed broadly and restricted solely by the scope of the appended claims.

What is claimed is:

1. In combination, a pilot chute having a canopy and a spring strap for ejecting the pilot chute from a plane, said strap having a section connected to the apex region of the pilot chute while another section along said strap is sufficiently detached from said canopy to permit said other strap section to be tensioned longitudinally relative to said canopy, and having clasps at the ends adapted to releasably engage respective catches on the plane, said strap being extensible along its length to load tensionally said spring strap between the catches for pilot chute ejecting action from said plane upon release of said strap from the catches.

2. The combination as described in claim 1, comprising a flexible band having its intermediate section secured to the intermediate section of the spring strap and having its ends secured to diametrically opposite sections respectively of the canopy.

3. The combination as described in claim 1, comprising lanyards connecting the ends of said spring strap to diametrically opposite sections respectively of the canopy.

4. The combination as described in claim 1, comprising a band having its intermediate section secured to the intermediate section of the spring strap and having its ends secured to diametrically opposite sections respectively of the canopy, and lanyards connecting the ends of said spring strap to diametrically opposite sections respectively of the canopy.

5. The combination as described in claim 1, wherein the spring device comprises a plurality of coil springs connected at their ends to the clasps, and a fabric covering for said springs shirred to permit the covering to expand upon expansion of the springs.

6. The combination as described in claim 1, wherein said clasps are in the form of buckles.

7. In combination,
(a) a plane having a compartment with a door movable into open position to form an exitway between one end of the door when open and said compartment,
(b) a parachute adapted to be stowed in said compartment, and
(c) means for deploying the parachute from said compartment automatically upon the opening of said door, and comprising
(d) a spring strap connected to the apex region of said parachute,
(e) means for releasably holding the ends of the spring strap to the inner side of the door with the spring strap tensionally loaded while the door is closed and extending towards said one end of the door,
(f) means for automatically releasing the end of the spring strap remote from said one end of the door when said door opens to a predetermined position to cause said spring strap to recoil towards the other held end of said spring strap located closer to said one end of the door, and
(g) means for releasing said other end of the spring strap from said door automatically as said spring strap recoils towards the latter end of the spring strap to cause said spring strap to be propelled out of the compartment through said exitway, carrying with it said parachute.

8. The combination as described in claim 7, wherein the compartment is located in the tail of the plane, the door is hinged to the top of this compartment on the forward end and swings open on the aft end, and the means for releasably holding the ends of the spring strap to the inner side of the door holds said strap in a forward-aft direction.

9. The combination as described in claim 8, the means for releasably holding the ends of the spring strap to the inner side of the door holding said strap in a forward-aft direction with a diagonal slant to eject the spring strap upon release with the attached parachute into one side of the slip stream where the flow is less turbulent than in the part of the stream directly behind the plane.

10. The combination as described in claim 7, wherein said means (e) for releasably holding the ends of the spring strap to the inner side of the door, and the means (f) for automatically releasing the end of the spring strap remote from said one end of the door comprises a clasp secured to the latter end of the spring strap, a pin secured to the door and engaged by said clasp in tensionally loaded condition of said spring strap while said door is closed and a stripper plate fixed to the frame of the plane and through which the pin extends in tensionally loaded condition of said spring strap, said pin withdrawing from engagement with said clasp as said door is opening and said stripper plate preventing the clasp from following said door in its opening movement, until said door reaches a predetermined position in which said pin is out of engagement with said clasp.

11. In combination,
(a) a plane with a compartment in the tail of the plane having a door hinged to the top of this compartment on the forward end and swingable into open position,
(b) a pilot chute adapted to be stowed in said compartment,
(c) a main plane braking parachute adapted to be stowed in said compartment and having its apex connected to the riser of said pilot chute and having its riser connected to the plane,
(d) means for deploying the main parachute from said compartment automatically upon the opening of said door, and comprising
(e) a spring strap connected to the apex region of said pilot chute
(f) means for releasably holding the ends of the spring strap to the inner side of the door with the spring strap extending in a forward-aft direction along the door and tensionally loaded while the door is closed,
(g) means for automatically releasing the forward end of the spring strap when said door opens to a predetermined position to cause said spring strap to recoil towards the other held aft end of said spring strap, and (h) means for releasing the aft end of the spring strap from said door automatically as said spring strap recoils towards the aft end of the spring strap to cause said spring strap to be propelled out of the compartment, carrying with it said pilot chute into the slip stream of the plane as said plane is landing on a runway, and causing thereby said pilot chute to inflate and thereby deploy said main braking parachute from said compartment.

12. The combination as described in claim 11, comprising a band having its intermediate section secured to the intermediate section of the spring strap and having its ends secured to diametrically opposite sections respectively of the canopy of the pilot chute and lanyards connecting the ends of said spring strap to diametrically opposite sections respectively of the canopy of the pilot chute.

References Cited in the file of this patent

UNITED STATES PATENTS

| | | |
|---|---|---|
| 1,037,749 | Feall | Sept. 3, 1912 |
| 1,940,950 | Honeywell | Dec. 26, 1933 |
| 2,120,477 | Adams | June 14, 1938 |
| 2,316,895 | Smith | Apr. 20, 1943 |
| 2,413,368 | Neff | Dec. 31, 1946 |